Patented May 30, 1939

2,160,577

UNITED STATES PATENT OFFICE 2,160,577

LUBRICANT

Oscar L. Maag, Canton, Ohio, assignor to The Timken Roller Bearing Company, Canton, Ohio, a corporation of Ohio No Drawing. Application September 11, 1937, Serial No. 163,351

3 Claims. (Cl. 87—9)

This invention relates to lubricants for use in assembling metal mating parts which require to have a heavy press fit, such, for instance, as a locomotive driving wheel on its axis. In such cases the axle or comparable part is initially slightly larger than the bore of the hub into which it is pressed. In order to effect assembly of these parts, it is necessary to have them well lubricated. Lubricants composed of white lead and linseed oil are now commonly used, but experience has shown that such lubricants break down under heavy pressures and that mating surfaces so lubricated are liable to be severely injured by galling and scoring in the process of assembly. Also, as press fits of mating parts are made tighter and press tonnages greater, due to the present requirement for higher locomotive speeds, this matter of galling and scoring is becoming more common and of greater concern.

When parts are injured by galling and scoring in assembly, they must be separated and the injured parts refinished to clean the surfaces. This involves removing metal from both hub bore and axle which destroys the original condition necessary for the press fit. In order to use these parts, it is necessary to finish other mating parts therefor to special dimensions to obtain the proper press fit, thus saving the injured parts but entailing considerable extra expense. Not only does the lubricant commonly used in the assembly of heavy press-fitted parts above mentioned generate considerable heat, due to friction and flow of metal in the mating parts, and so increase the labor of assembling and possibility of injury, but it is found that this lubricant will gather in any oil holes which may be present in axle, sleeves or bearing race where it hardens and prevents the proper functioning of the oil holes.

The principal object of the present invention is to devise a lubricant which will afford substantial protection against galling and scoring of parts in the process of press-fitting them together, and also to devise a heavy-pressure lubricant which will not gather and harden and interfere with the proper functioning of the oil holes. The invention consists in the lubricant hereinafter described and claimed.

The following is the preferred composition embodying my invention, namely, 200 parts by weight of white lead, 50 parts by weight of elemental sulphur, and 60 parts by weight of a mixture of mineral oil and hexachlorethane, the mineral oil having a viscosity of about 100 seconds at 210 degrees Fahrenheit and the hexachlorethane constituting about 15 percent of the oil mixture. The oil mixture of the preferred composition comprises a mineral oil of a gravity of about 20 to 30 degrees Beaumé with which the hexachlorethane is incorporated, prior to mixing with the white lead and sulphur, by heating them together at a temperature of about 200 degrees Fahrenheit. Thus the mineral oil constitutes about 51 parts or 16.5 percent by weight of the entire preferred composition above set forth and the hexachlorethane constitutes about 9 parts or 2.9 percent thereof. This composition constitutes a lubricant of the extreme pressure type and has very little tendency to gather and harden.

The foregoing formula admits of variation. For instance, the viscosity of the mineral oil may range from 40 to 150 seconds at 210 degrees Fahrenheit; and the proportions of the ingredients may vary as much as 10 percent from the formula stated.

While I have designated mineral oil in the preferred formula, it may be replaced with either a vegetable oil or an animal oil of the same viscosity. The following vegetable oils are suitable substitutes for mineral oil, namely: rapeseed oil, cottonseed oil, and corn oil. Likewise, the following animal oils are suitable substitutes for mineral oil: lard oil, sperm oil and whale oil.

While I have designated elemental sulphur as an ingredient for my preferred formula, it may be replaced with an equivalent amount of either of the following sulphur compounds: sulphurized lard oil, sulphurized fish oil, sulphurized corn oil or sulphurized cottonseed oil.

Likewise, any of the following chlorine compounds may be substituted for an equivalent amount of hexachlorethane, namely: chlorinated naphthalene or chlorinated diphenyl or a chlorinated petroleum compound. Likewise, tri-cresyl phosphate can be used to replace an equal quantity of hexachlorethane in the preferred formula above stated. Accordingly, I do not wish to be restricted to the particular formula set forth above.

What I claim is:

1. A lubricant which consists of the following ingredients in substantially the following proportions by weight, namely, 200 parts of white lead, 50 parts of an ingredient selected from the group consisting of elemental sulphur, sulphurized lard oil, sulphurized fish oil, sulphurized corn oil and sulphurized cottonseed oil, 51 parts of an oil selected from the group which consists of mineral oil, rapeseed oil, cottonseed oil, corn oil, lard oil, sperm oil and whale oil, and 9 parts of an ingredient selected from the group consisting of hexachlorethane, chlorinated naphthalene, chlorinated diphenyl, chlorinated petroleum compounds and tri-cresyl phosphate.

2. A lubricant which consists of the following ingredients in substantially the following proportions by weight, namely, 200 parts of white lead, 50 parts of elemental sulphur, 51 parts of an oil selected from the group which consists of mineral oil, rapeseed oil, cottonseed oil, corn oil, lard oil, sperm oil and whale oil, and 9 parts of an ingredient selected from the group consisting of hexachlorethane, chlorinated naphthalene, chlorinated diphenyl, chlorinated petroleum compounds and tri-cresyl phosphate.

3. A lubricant consisting of the following ingredients in substantially the following proportions by weight, namely, 200 parts of white lead, 50 parts of sulphur, 51 parts of mineral oil and 9 parts of hexachlorethane, said mineral oil having a viscosity of from 40 to 150 seconds at 210 degrees Fahrenheit.

OSCAR L. MAAG.